United States Patent [19]

Mathews

[11] 4,015,692
[45] Apr. 5, 1977

[54] AUTOMATIC SLACK ADJUSTER

[75] Inventor: George P. Mathews, Birmingham, Mich.

[73] Assignee: Borg-Warner Corporation, Chicago, Ill.

[22] Filed: Nov. 6, 1975

[21] Appl. No.: 629,424

[52] U.S. Cl. .................. 188/79.5 K; 188/196 BA
[51] Int. Cl.² ......................................... F16D 65/56
[58] Field of Search ............... 188/79.5 K, 79.5 P, 188/196 R, 196 BA

[56] References Cited
UNITED STATES PATENTS

| 2,920,724 | 1/1960 | Margetic et al. | 188/79.5 K X |
| 3,351,163 | 11/1967 | Sander et al. | 188/79.5 K X |
| 3,727,728 | 4/1973 | Bostwick | 188/79.5 K |

Primary Examiner—Duane A. Reger
Attorney, Agent, or Firm—James A. Geppert

[57] ABSTRACT

An automatic slack adjuster for vehicle brakes that automatically and continuously compensates for the wear of the brake linings and does not depend on a fixed reference point on the vehicle chassis for actuation of the adjustment mechanism. The present invention has a control arm integral with a ring journalled in the braking lever, an actuating piston rod to rotate the braking lever and actuate the vehicle brake and a flexible strut member extending between and rigidly connected to the piston rod and a transverse surface at the outer end of the control arm. The flexible strut member allows the outer end of the control arm to act as a reference point but allows it to float during operation of the braking lever and returns the reference point to its desired location upon retraction of the braking lever and piston rod.

16 Claims, 6 Drawing Figures

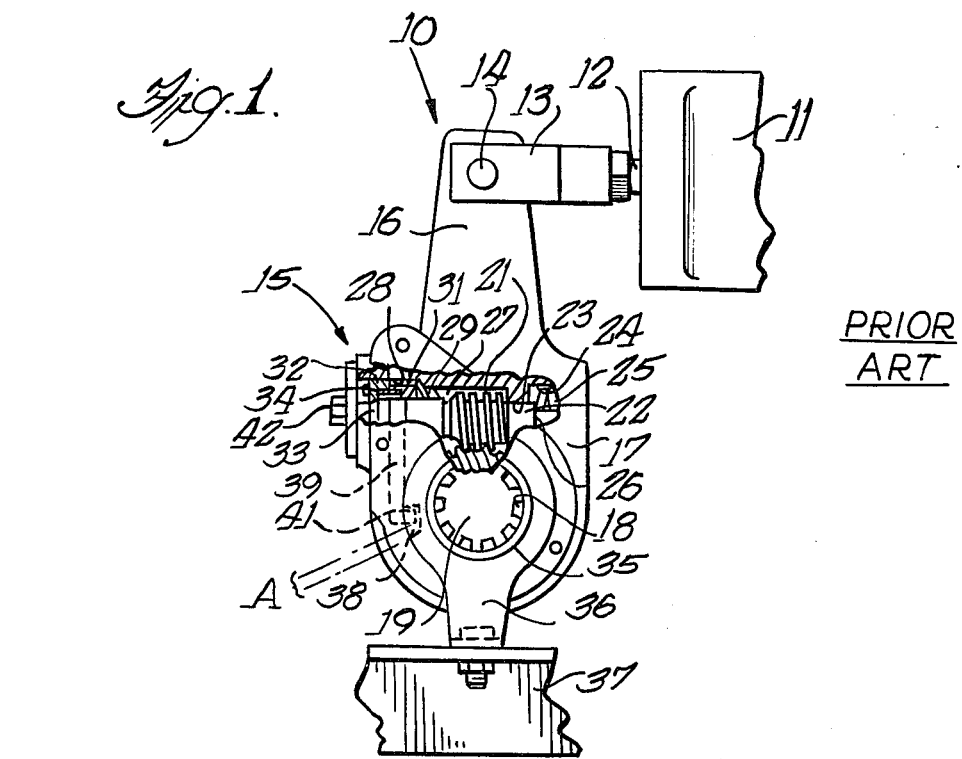
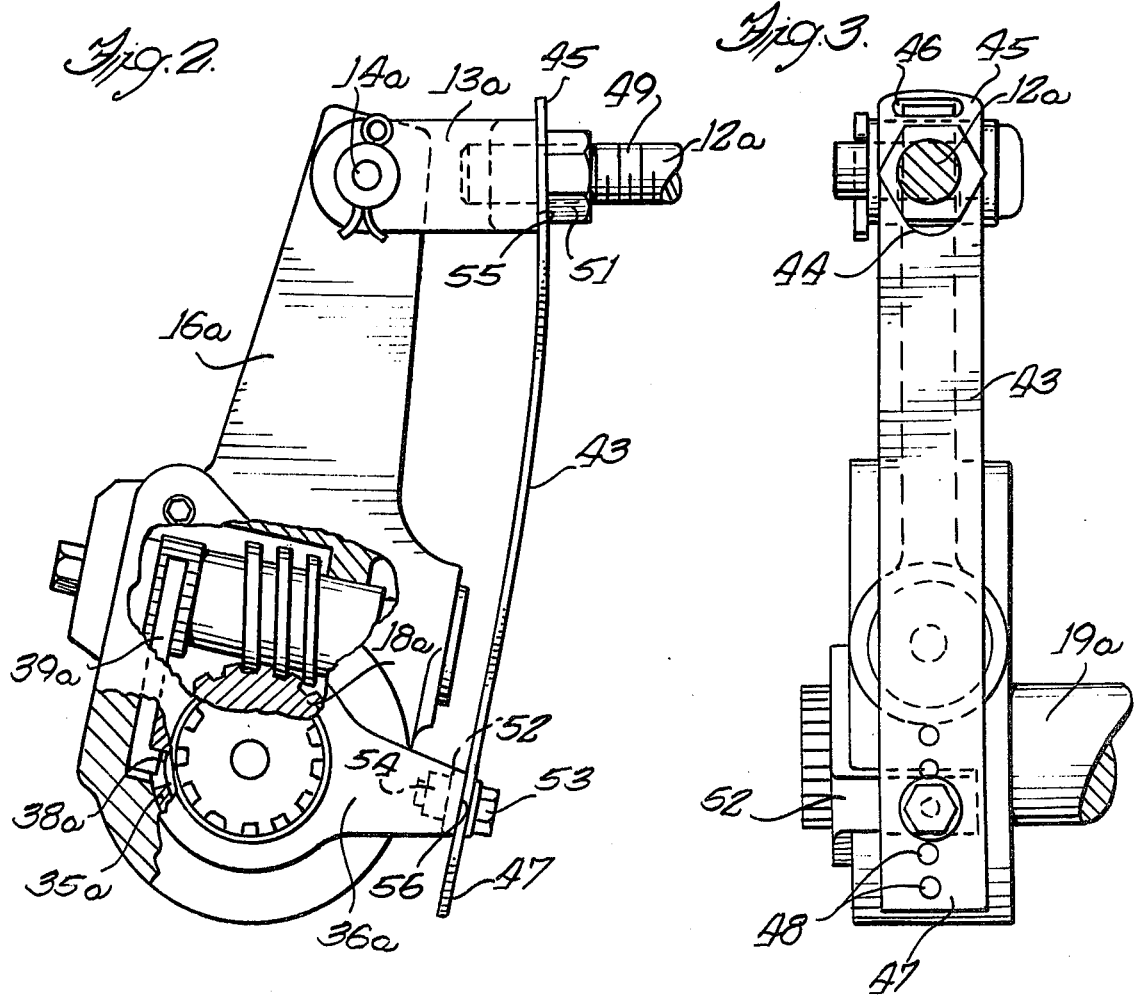

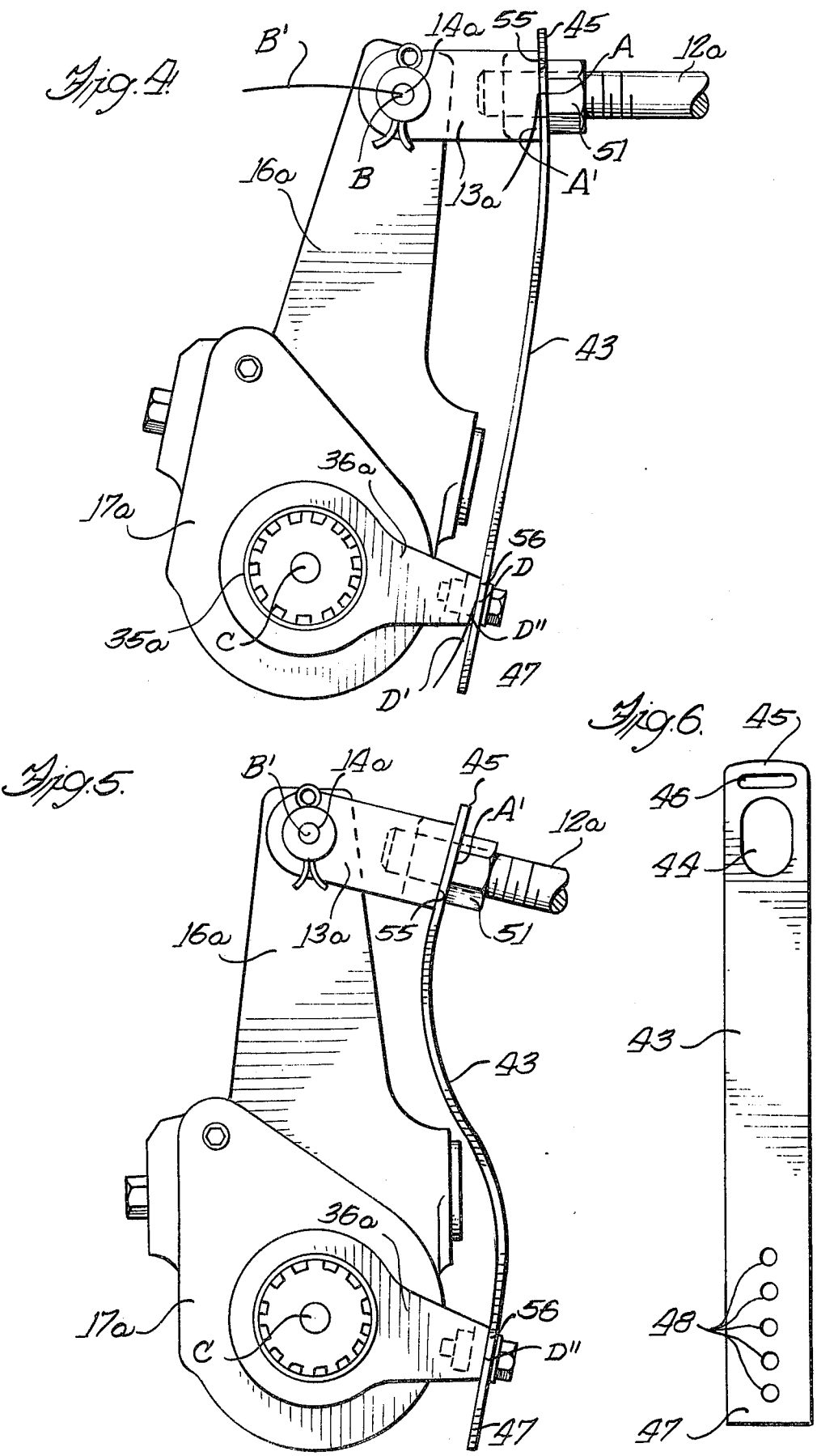

AUTOMATIC SLACK ADJUSTER

BACKGROUND AND SUMMARY OF THE INVENTION

The present invention relates to an automatic slack adjuster for a vehicle brake and more particularly to an automatic slack adjuster having a floating reference point for the adjustment mechanism controlling the running clearance or slack of the vehicle brake as the brake linings wear during use.

Vehicle brake slack adjusters for heavy duty vehicles requiring high braking power have either a manual adjustment or, more recently, an automatic adjustment. Brake lining wear causes a gradual increase in the brake cylinder piston stroke with a consequent decrease in braking efficiency between manual adjustments. In view of this and other problems attendent with manual adjustment, automatic slack adjusters have been developed to provide for automatic and continuous compensation for the wear of the brake linings.

Automatically adjusting brake levers employing brake chamber piston rod linkages utilize the relative motion between the lever and the piston rod to actuate the adjusting mechanism on each piston stroke. Many of the presently known automatic slack adjusters, as exemplified by the U.S. Pat. Nos. 3,351,164 and 3,392,810 provide a ground or stationary reference point which cooperates with a driving member in the rotatable braking lever to provide movement of the driving member upon excessive rotation of the braking lever beyond a predetermined position; the movement of the driving member acting to cause rotation of a worm meshing with a worm gear on the braking cam shaft to adjust the amount of slack in the system.

Reference is also made to U.S. Pat. No. 3,692,152 wherein the ground reference point is replaced with a rigid link pivotally mounted on the brake piston rod and pivotally secured to the free end of an arm having an annular position rotatable in the braking lever. The arm is substantially parallel with the piston rod in the brake release position; such that upon rotation of the braking lever under the impetus of the piston rod, the piston, link, braking lever and arm provide a gradually shifting parallelogram which causes rotation of the braking lever relative to the arm to actuate the adjustment mechanism. Here again, a stationary reference point, although not rigidly secured to ground, is utilized for the actuating mechanism.

The present invention, however, has the purpose of employing the piston rod connected to the braking lever as an attachment means acting to control the movement of the reference point and thus provide a floating point which will be accurately returned to a reference location upon retraction of the braking lever and piston. To accomplish this feature, a flexible strut member is utilized extending between the piston rod and the reference arm for the adjusting mechanism. The strut member is rigidly attached at its opposite ends to the piston rod at the clevis connection with the braking lever and to the outer end of the actuating arm, such that the strut will be in an unstressed condition when the piston rod is retracted to the brake release position, and the point of connection between the strut and actuating arm becomes the reference point for the adjusting mechanism.

The present system utilizing a flexible strut member extending between the piston rod and control arm will cause the reference point established at the free end of the control arm to float during a stroking or brake engaging operation but will restore the point very closely to a predetermined position at the critical clearance sensing portion of travel, i.e. just before arrival at full-off or brake release near the end of the release stroke. The system recognizes that the reference point can float any amount except at the critical moment and provides a linkage that achieves the desired reference point of the system at rest.

The flexible strut member can accommodate offsets and variable lever lengths and will function without being jammed by ice, dirt or rocks. The strut member may be in the form or material that will act in tension and compression to achieve the desired result and will resist corrosion.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a side elevational view, partially broken away, of a presently known automatic slack adjuster having a fixed ground reference point.

FIG. 2 is a side elevational view, partially broken away, of the automatic slack adjuster of the present invention.

FIG. 3 is an end elevational view taken from the right-hand side of FIG. 2.

FIG. 4 is a side elevational view of the slack adjuster of FIG. 2 in the brake release position.

FIG. 5 is a view similar to FIG. 4 but in the brake apply position.

FIG. 6 is a front elevational view of the flexible strut member.

DESCRIPTION OF THE PREFERRED EMBODIMENT

Referring more particularly to the disclosure in the drawings wherein is shown a preferred embodiment of the present invention, FIG. 1 discloses a presently known automatic slack adjuster assembly 10, as disclosed in U.S. Pat. No. 3,392,810, wherein an air cylinder 11 actuates a piston rod 12 connected to a clevis 13 which, in turn, is pivotally connected through a pivot pin 14 to the upwardly extending lever 16 of the slack adjuster 15. The slack adjuster 15 includes a housing 17 integral with the lever 16 and having a cavity containing a worm gear 18 internally splined to be non-rotatably connected to a cam shaft 19 for a brake actuating cam (not shown).

Also within the housing 17 is a worm 21 in a recess 27 meshing with the worm gear 18 and carried on a worm shaft 22 rotatably mounted in a passage 23. At one end beyond the recess 27, the passage 23 is enlarged at 24 to receive a spring assembly 25, preferably in the form of stacked Belleville springs, acting against a shoulder 26 on the shaft to urge the shaft to the left as seen in FIG. 1. On the opposite side of the recess 27, the passage is enlarged at 28 to receive a bearing sleeve 29 for the shaft, a gear wheel 31 journalled on the worm shaft, and a clutch element 32 journalled in the enlarged passage portion 28. The clutch element 32 has a tapered surface adapted to be engaged by a complementary tapered surface 33 formed on the worm shaft 22. The clutch element 32 and the gear wheel 31 are provided with coaxial internal cylindrical surfaces adapted to be engaged by a one-way clutch 34 formed as a helical coiled spring; the spring being wound so as to expand and engage the surfaces upon one direction of rotation of the gear wheel and to slip upon rotation in the opposite direction.

A ring 35 of a diameter larger than that of the worm gear 18 is journalled in the housing coaxially with the worm gear 18 and is provided with a laterally extending arm 36 rigidly mounted on a stationary portion 37 of the vehicle chassis. The ring is provided with a peripheral arcuate recess 38 having limiting surfaces adapted to engage a projection 41 formed at the lower end of a slide member 39 mounted for limited motion in a groove in the housing 17; the slide member having a toothed rack meshing with the gear wheel 31.

In operation, the distance A corresponds to the normal running clearance between the brake linings and brake drum; the distance A also being the amount of lost motion permitted by the projection 41 in the recess 38 of the ring 35. Also, the spring assembly 25 urges the worm shaft 22 to the left, as viewed in FIG. 1, so that the tapered surface 33 on the shaft engages the complementary surface in the clutch element 32. During normal operation when the brake linings are new and the brake pedal is depressed by the vehicle operator, the air cylinder 11 projects the piston rod 12 to rotate the lever 16 and housing 17, causing rotation of the worm gear 18 and cam shaft to urge the brake linings into engagement with the brake drum. Also, rotation of the housing causes movement of the slide member 39 relative to the ring 35.

Once wear begins to occur in the brake linings, rotation of the lever will exceed the distance A to engage the brake linings with the drum. Thus, once the running clearance provided by the lost motion connection between the projection 41 and the recess 38 has been traversed, the additional movement of the lever 16 causes the projection to engage the lower stop of the recess 38 in the stationary ring 35. This additional movement caused by the lining wear results in upward movement of the slide member 39 to rotate the gear wheel 31, however, the one-way clutch 34 is disengaged from the gear wheel 31 and clutch element 32 in this direction of rotation. Once the brake linings engage the brake drum, any additional movement of the lever 16 due to elasticity or deformation of the brake drum, brake linings and power transmission between the brake cylinder and the wheel brake unit causes the worm and worm shaft to be displaced axially against the force of the spring assembly 25 so that the tapered clutch surfaces between the clutch element 32 and the worm shaft are disengaged.

When the brake pedal is released and the air cylinder 11 acts to retract the piston rod 12, the first increment of movement of the lever 16 covers the arc of movement due to elasticity or deformation, and once this movement has occurred, the tapered clutch surfaces are re-engaged. During subsequent movement, the worm and worm gear are locked due to the force of brake engagement, and the slide member 39 will remain stationary until the lost motion travel of the recess 38 relative to the projection 41 has been traversed. When the brake linings are disengaged from the drum and the projection 41 engages the upper stop of the recess 38, rotary movement of the lever 16 relative to the ring 35 will cause downward movement of the slide member 39, resulting in rotation of the gear wheel 31 and actuation of the one-way clutch 34. The clutch will cause rotation of the clutch element 32 and the worm shaft 22 and worm 21. The turning force of the worm 21 causes rotation of the worm gear 18 which turns the cam shaft and adjusts the running clearance between the brake linings and the brake drum.

In installing this type of slack adjuster on a vehicle, a control arm anchor bracket (not shown) is positioned on a stationary portion of the vehicle chassis, such as a stationary portion of the axle, the adjuster 15 is mounted on the brake cam shaft with the splines 19 on the worm gear 18 engaging the splined end of the shaft, the opening in the lever 16 is aligned with the openings in the clevis 13 and the pivot pin 14 is installed. The control arm 36 is then manually moved until it is fully in contact with the stop or projection 41, and then the bracket is shifted so that the outer end of the arm 36 is aligned with a mounting portion thereof, and the bracket is then tightened in that location and secured to the arm 36. If adjustment is required before use, an exposed hexagonal end 42 of the worm shaft 22 is engaged by a wrench or other suitable tool and the worm shaft rotated to adjust the initial running clearance for the adjuster.

Now considering the present invention shown in FIGS. 2 through 6, the identical parts shown in these views will have the same reference numerals accompanied by a script a. In this embodiment, the stationary ground point 37 is omitted and replaced by a flexible strut member or strap 43. The strut member is an elongated element formed of a suitable material, which may be, for example, stainless steel, that will act in both tension and compression and will resist corrosion. The strut member or strap has an elongated slot 44 adjacent one end 45 with a small transverse slot 46 between the slot 44 and the end 45 of the strap for a purpose to be later described. The opposite end 47 of the strap has a plurality of longitudinally spaced openings 48 at increments to suit variable lever lengths and offsets.

The strap is rigidly installed on the slack adjuster 15a with the elongated slot 44 receiving the threaded end 49 of the piston rod 12a therethrough, which rod is threadedly secured in the base of the clevis 13a. The strap is secured onto the piston rod abutting a face 55 of the clevis through a jam or lock nut 51 on the threaded end 49. The opposite end 47 of the strap is rigidly secured to a lateral flange or end 52 abutting a face 56 of the control arm 36a by suitable securing means, such as a bolt 53 and nut 54; with the bolt extending through an opening in the flange 52 and one of the openings 48 in the strap. Obviously, the ring 35a and its integral control arm 36a must be rotated relative to the lever 16a from the position shown in FIG. 1 to the position shown in FIG. 2. Thus, the clevis, strap and control arm form a single flexible link with two pivot points in a two-bar linkage. In view of the flexibility of the strap 43, this two-bar linkage is capable, within limits, of behaving as a four bar linkage as will be later described.

Considering the action of this flexible linkage, the strap 43 is secured to the clevis 13a at point A and to the control arm 36a at point D. The clevis is pivoted on the lever 16a through the pivot pin 14a at point B, and the ring 35a and control arm 36a are free to pivot about point C, the axis of the cam shaft 19a and the worm gear 18a. When in the full brake release position, a tool may be inserted into the transverse slot 46 to pry the strap 43 relative to the piston rod 12a so that there is substantially no tension or compression in the strap and the jam nut 51 is tightened.

When pressurized by the brake system, the air cylinder or brake chamber (not shown in FIGS. 2 through 5) acts on the piston rod 12a to provide torque on the cam shaft with travel of the lever 16a about point C from point B to a new position B' where the brake linings engage the brake drum. During this movement, point A moves to a new position A' with respect to the lever 16a. If the strap 43 were rigid and pivoted at points A and D, point D would travel to a new position D', such that the distance D—D' would equal the distance A—A' with respect to the lever, causing loss of control over the relationship of the slide member 39a and the recess 38a in the ring 35a. Since the strap 43 is not pivoted at A and D but is flexible, point D will not move as great a distance as A—A', but will move to a new position D'' such that the distance D—D'' is less than A—A' and thus will exercise more control over the position of point D.

Therefore, utilizing the flexible strap 43, the movement of point B to point B' produces a relative motion between (a) the piston rod 12a and the lever 16a represented by the change in angle ABC to the angle A'B'C, (b) the lever 16a and the arm 36a represented by point D'', and (c) the increased angle between the clevis face 55 and the arm face 56 holding the strap at A' and D'', respectively. The increased face angle imposes an S shaped curvature of deflection in the strap as seen in FIG. 5. This consumes a portion of the strap length such that the straight line distance A'D'' is less than AD, thus modifying the position of point D with respect to the piston rod 12a and providing a means to control the position of point D with respect to the piston rod 12a and providing a means to control the position of point D with respect to the vehicle. This means of control is obtained by selecting the degree of flexibility of the strap. Further, the deflection in the strap represents a stored stress that can be given up as a restoring force to the control arm 36a during the return stroke of the piston rod 12a to urge the arm to its original position.

The strap 43 must have deflection properties selected to control the movement of point D with respect to the piston rod 12a so as to limit or prevent movement of point D with respect to the vehicle and be strong enough to prevent yield under full stroke deflection and maintain the original geometry of point D. Also, the strength of the strap must be sufficient to prevent localized flexing to develop localized set that would alter the installed geometry. Thus, the present system provides a floating reference point D, such that whatever motion is imparted to point D during a brake application, the system will return point D to or close enough to its installed position to control the operation of the adjusting system and control slack or running clearance as described for the operation of the adjuster of FIG. 1. The restoration of point D occurs at the critical clearance sensing position of travel just before arriving at the full location near the end of the release stroke. The system recognizes that the reference point D can float any amount except at the critical moment and provides a linkage that achieves the desired reference point.

This means of controlling the ground of reference point from the piston rod does not require special clevis equipment to install, needs no special brackets to adapt to the vehicle, is more universal in installation, handles offset levers with the same ease as straight levers, and can be executed in any form and material that provides the required strength and flexibility combination. Also, the strap should be of a material to resist corrosion and damage from ice, mud and stone jams.

While the improvement has been shown and described as being advantageously applicable to a slack adjuster for vehicle brakes, this adjustment arrangement can be utilized for other lever actuating systems where adjustment is necessary due to wear or distortion of parts; and it is to be understood the scope and the utility of the improved features is not to be considered limited to brake actuators only.

I claim:

1. In a slack adjusting mechanism usable in lever actuating systems including a rotatable lever actuated by an actuating chamber and piston rod and connected to and rockable about the axis of rotation of a cam shaft for actuation of the system, said piston rod being secured to a clevis pivotally mounted on said lever, a worm gear in the lever secured to the cam shaft and meshing with a worm mounted on a rotatable shaft, and an adjusting mechanism including a reference point operatively connected to the worm and actuatable when the lever rocks through an arc to a point beyond the movement required for normal clearance, said reference point being provided on the end of a control arm, the opposite end of the control arm being formed as a ring journalled in said lever around the axis of rotation of the cam shaft, and means to control the location of said reference point with respect to said system during the lever rocking motion while allowing motion of said reference point with respect to said piston rod.

2. A slack adjusting mechanism as set forth in claim 1, wherein said control means is a two-bar linkage, one bar of said linkage being the lever and the second bar is pivotally connected to said lever at a pair of spaced points.

3. A slack adjusting mechanism as set forth in claim 2, wherein one of said spaced points is a clevis pin pivotally mounting the clevis on the lever and the other point is the axis of rotation of the ring on the control arm journalled in the lever.

4. A slack adjusting mechanism as set forth in claim 3, in which said second bar includes said clevis, said control arm and an elongated strut member rigidly connected at opposite ends to said clevis and control arm.

5. A slack adjusting mechanism as set forth in claim 4, in which said strut member is formed of a flexible material such that the distance between the fastening points of the strut member is modified upon rocking motion of the lever.

6. A slack adjusting mechanism as set forth in claim 5, in which a lock nut is threaded on the piston rod to engage a face of the clevis, and said control arm terminates in a transverse face, said strut member being rigidly fastened to the faces of said clevis and control arm.

7. A slack adjusting mechanism as set forth in claim 6, wherein said strut member is mounted on said piston rod and secured to the clevis by said lock nut, said strut member being secured to said transverse face of the control arm by suitable securing means.

8. A slack adjusting mechanism as set forth in claim 6, wherein the distortion of said strut member is a result of the changes in angularity of the faces of the clevis and control arm with respect to each other during rocking motion of said lever.

9. A slack adjusting mechanism as set forth in claim 8, wherein the distortion of said strut member changes the distance between the points of attachment of the strut member, thereby modifying the location of the reference point relative to the clevis portion of said second bar and controlling the location of said reference point.

10. A slack adjusting mechanism as set forth in claim 9, wherein the flexibility of said strut member allows distortion thereof stress therein during application motion, and said stored stress providing a positional restoring force for the reference point during the release motion.

11. A slack adjusting mechanism as set forth in claim 5, whereby the flexible strut member acting in conjuction with said clevis and control arm simulates the pivot point motion control of a four bar linkage.

12. A slack adjusting mechanism as set forth in claim 5, in which said strut member has a series of spaced openings adjacent one end and an elongated opening and a transverse slot spaced therefrom adjacent the opposite end.

13. A slack adjusting mechanism for vehicle brakes of the type requiring a ground reference point, comprising a rockable braking lever actuated by a brake chamber and piston rod, a clevis connecting the piston rod and braking lever together, a worm gear in said lever and mounted on a cam shaft for actuating the vehicle brakes, said braking lever being rockable about the axis of rotation of said cam shaft, a worm mounted on a rotatable worm shaft and meshing with said worm gear, and an adjusting device including a ring journalled in said lever on the axis of said cam shaft and having a radially extending control arm terminating in a transverse face providing the reference point, a slide member operatively connected to said ring and to a rotatable member journalled on said worm shaft, one-way clutch means acting to connect said rotatable member and said worm shaft upon rocking movement of said braking lever in one direction of rotation, and an elongated flexible strut member having one end mounted on said piston rod and rigidly secured to a face of said clevis and the opposite end rigidly secured to said transverse face of said control arm, said flexible strut member along with said clevis and said control arm pivotally mounted at spaced points on said braking lever forming a two bar linkage which, due to the flexibility of said strut member simulates the pivot point motion control of a four bar linkage.

14. A slack adjusting mechanism as set forth in claim 13, wherein rocking movement of said braking lever will cause distortion of said flexible strut member as a result of the changes in angularity of the faces of the clevis and the control arm with respect to each other.

15. A slack adjusting mechanism as set forth in claim 14, wherein the distortion of said strut member alters the distance between the points of attachment of the strut member, thereby modifying the location of the reference point relative to said clevis and controlling the location of said reference point with respect to the vehicle.

16. A slack adjusting mechanism as set forth in claim 15, wherein the flexibility of said strut member allows the distortion thereof to store stress therein during brake application motion, and said stored excess provides a positional restoring force and for the reference point during the brake release movement.

* * * * *

UNITED STATES PATENT OFFICE
CERTIFICATE OF CORRECTION

PATENT NO. : 4,015,692
DATED : April 5, 1977
INVENTOR(S) : George P. Mathews

It is certified that error appears in the above-identified patent and that said Letters Patent are hereby corrected as shown below:

Column 8, line 33, cancel "excess" and insert -- stress --.

Signed and Sealed this nineteenth Day of July 1977

[SEAL]

Attest:

RUTH C. MASON
*Attesting Officer*

C. MARSHALL DANN
*Commissioner of Patents and Trademarks*